(12) United States Patent
Hoffjann

(10) Patent No.: US 10,583,935 B2
(45) Date of Patent: Mar. 10, 2020

(54) SUPPLY SYSTEM FOR PROVIDING AT LEAST OXYGEN DEPLETED AIR AND WATER IN A VEHICLE AND AIRCRAFT HAVING SUCH A SUPPLY SYSTEM

(71) Applicant: Airbus Operations GmbH, Hamburg (DE)

(72) Inventor: Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 939 days.

(21) Appl. No.: 14/833,567

(22) Filed: Aug. 24, 2015

(65) Prior Publication Data
US 2016/0362191 A1    Dec. 15, 2016

(30) Foreign Application Priority Data
Aug. 28, 2014  (EP) .................................... 14182721

(51) Int. Cl.
*B64D 45/00*         (2006.01)
*H01M 8/04014*    (2016.01)
(Continued)

(52) U.S. Cl.
CPC .............. *B64D 45/00* (2013.01); *B64D 11/02* (2013.01); *B64D 13/06* (2013.01); *B64D 37/02* (2013.01);
(Continued)

(58) Field of Classification Search
CPC ......... H01M 8/04835; H01M 2250/20; H01M 2008/1095; Y02T 90/32; Y02T 90/36; A62C 99/0018; B64D 2041/005
See application file for complete search history.

(56) References Cited

U.S. PATENT DOCUMENTS

| 3,847,298 A | 11/1974 | Hamilton |
| 6,609,582 B1 * | 8/2003 | Botti ........................ B60K 6/24 |
| | | 180/309 |

(Continued)

FOREIGN PATENT DOCUMENTS

| EP | 1860720 A1 | 11/2007 |
| FR | 2870390 A1 | 11/2005 |

(Continued)

OTHER PUBLICATIONS

European Search Report dated Mar. 9, 2015.

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

A supply system for providing at least oxygen depleted air and water in a vehicle includes at least one hydrogen supply means, an air channel having an inlet and an outlet, an air cooled fuel cell unit couplable with the hydrogen supply means and arranged inside the air channel and at least one catalytic converter couplable with the hydrogen supply means and arranged between the fuel cell unit and the outlet of the air channel inside the air channel. The air cooled fuel cell unit is adapted for conducting a fuel cell process under consumption of air flowing from the inlet of the air channel through the air cooled fuel cell unit and hydrogen from the hydrogen supply means. At least one catalytic converter is adapted for producing water and oxygen depleted air under consumption of hydrogen from the at least one hydrogen supply means and air.

16 Claims, 1 Drawing Sheet

(51) Int. Cl.
*H01M 8/04119* (2016.01)
*H01M 8/04082* (2016.01)
*B64D 37/32* (2006.01)
*B64D 41/00* (2006.01)
*B64D 11/02* (2006.01)
*H01M 8/04828* (2016.01)
*H01M 8/0662* (2016.01)
*H01M 8/04701* (2016.01)
*B64D 13/06* (2006.01)
*B64D 37/02* (2006.01)
*H01M 8/04089* (2016.01)
*A62C 3/08* (2006.01)
*A62C 99/00* (2010.01)
*H01M 8/1018* (2016.01)

(52) U.S. Cl.
CPC .............. *B64D 37/32* (2013.01); *B64D 41/00* (2013.01); *B64D 41/007* (2013.01); *H01M 8/04014* (2013.01); *H01M 8/04089* (2013.01); *H01M 8/04126* (2013.01); *H01M 8/04201* (2013.01); *H01M 8/04701* (2013.01); *H01M 8/04835* (2013.01); *H01M 8/0662* (2013.01); *A62C 3/08* (2013.01); *A62C 99/0018* (2013.01); *B64D 2041/005* (2013.01); *B64D 2045/009* (2013.01); *H01M 2008/1095* (2013.01); *H01M 2250/20* (2013.01); *Y02T 90/32* (2013.01); *Y02T 90/36* (2013.01)

(56) References Cited

U.S. PATENT DOCUMENTS

| | | | |
|---|---|---|---|
| 6,655,325 B1* | 12/2003 | Botti | B01D 53/9454 |
| | | | 123/3 |
| 6,915,869 B2 | 7/2005 | Botti et al. | |
| 7,763,368 B2* | 7/2010 | Kaye | B01J 8/0214 |
| | | | 429/424 |
| 7,815,148 B2 | 10/2010 | Kwok | |
| 9,882,230 B2* | 1/2018 | Hausmann | H01M 8/2483 |
| 2002/0102452 A1* | 8/2002 | Reiser | H01M 8/04089 |
| | | | 429/455 |
| 2004/0043276 A1* | 3/2004 | Hoffjann | B01D 53/02 |
| | | | 429/411 |
| 2004/0121207 A1* | 6/2004 | Bunker | H01M 8/04007 |
| | | | 429/415 |
| 2010/0221642 A1* | 9/2010 | Frahm | B64D 11/02 |
| | | | 429/512 |
| 2013/0200216 A1 | 8/2013 | Mock et al. | |

FOREIGN PATENT DOCUMENTS

| | | |
|---|---|---|
| WO | 2013/140312 A2 | 9/2013 |
| WO | 2013/142161 A1 | 9/2013 |

\* cited by examiner

SUPPLY SYSTEM FOR PROVIDING AT LEAST OXYGEN DEPLETED AIR AND WATER IN A VEHICLE AND AIRCRAFT HAVING SUCH A SUPPLY SYSTEM

FIELD OF THE INVENTION

The invention relates to a supply system for providing at least oxygen depleted air and water in a vehicle as well as to an aircraft having such a supply system.

BACKGROUND OF THE INVENTION

Today's aircraft are often equipped with separate systems for providing emergency power and cargo fire suppression. It is known to use a ram air turbine for providing emergency power especially for a so-called "total engine flame out" (TEFO) situation or the loss of a main electrical power supply. Ram air turbines are capable for providing sufficient power when the speed of impinging ram air exceeds a certain minimum. However, this may be critical in a phase close to touch down during the landing phase of the aircraft.

As fire suppression systems or fire extinguishing systems for cargo compartments of an aircraft Halon fire extinguishers were often used. However, due to adverse effects of Halon for the ozone layer and as the commercial use of Halon will be limited by authorities, a replacement of Halon is necessary.

In civil aviation, potable water systems are well-known, which use on board water storage tanks for providing the quantity of water used in flight by passengers and crew and lavatories and galleys. It is known to generate potable water on board an aircraft by means of fuel cells under consumption of hydrogen and oxygen. However, this kind of water generation is directly coupled with the generation of electrical power. Hence, water will only be produced if the demand for electric power is sufficient.

In case air is used as an oxidant for said fuel cells, its oxygen content when generating water is depleted. If the remaining oxygen content in the cathode air is reduced to approximately 12% or less, this oxygen depleted air is usable for suppressing fire in case of a fire event on board or be used for fuel tank inerting or increasing safety in the fuel system. The depletion of oxygen is directly coupled with the demand for electric power and the stoichiometry in the fuel cell.

BRIEF SUMMARY OF THE INVENTION

Consequently, an aspect of the invention may provide a supply system for providing at least oxygen depleted air and water in a vehicle, which supply system is capable of independently generating oxygen depleted air and, if required, water in case of an emergency. At the same time, the complexity and the weight of the supply system shall be as low as possible in order to reduce costs.

A supply system for providing at least oxygen depleted air and water in a vehicle is proposed, which system comprises at least one hydrogen supply means, an air channel having an inlet and an outlet, an air cooled fuel cell unit and at least one catalytic converter. The air channel is adapted for leading air from the inlet to the outlet. The fuel cell unit is couplable with the at least one hydrogen supply means and is arranged inside the air channel. The at least one catalytic converter is couplable with the at least one hydrogen supply means and is arranged between the fuel cell unit and the outlet of the air channel inside the air channel. If there is more than one catalytic converter the fuel cell unit may also be located between said catalytic converters so that at least one of the catalytic converters is located upstream to the fuel cell unit. The fuel cell unit is adapted for conducting a fuel cell process under consumption of air flowing from the inlet of the air channel through the fuel cell unit and hydrogen from the at least one hydrogen supply means. At least one of the at least one catalytic converter is adapted for producing water and oxygen depleted air under consumption of hydrogen from the at least one hydrogen supply means and air.

The at least one hydrogen supply means may be any device that is capable of supplying hydrogen or a hydrogen containing gas to the fuel cell unit and the at least one catalytic converter. This may include a hydrogen storage tank, e.g. a storage tank for compressed storage of gaseous hydrogen or a cryogenic storage tank for storage of liquid hydrogen, as well as for chemical storage such as by means of a metal hydride or chemical hydride. Still further, the hydrogen supply means may simply comprise a hydrogen supply line or a hydrogen supply port coupled with a hydrogen source in the vehicle. The hydrogen does not necessarily have to be pure hydrogen. Instead, it may also be generated in a fuel processor, which is able to reform an ordinary fuel into a hydrogen enriched gas especially for fuel cells.

The air channel may comprise a housing or at least a set of walls, which provide a radially closed cross-sectional surface, which extends along a certain path, wherein a first end of the path comprises the inlet and wherein a second end of the path comprises the outlet. The air channel is a means for leading air through from any source. The air channel preferably has dimensions that are sufficient for housing the air cooled fuel cell unit and the at least one catalytic converter.

The air cooled fuel cell unit may comprise at least one fuel cell, e.g. a single fuel cell, a fuel cell stack or a plurality of fuel cell stacks, wherein the at least one fuel cell is able for conducting a fuel cell process under consumption of hydrogen and air for generating electric power, oxygen depleted air and water. The fuel cell itself may be of any suitable type, which may include a low temperature, a medium temperature or a high temperature fuel cell type that produces electricity and heat. For the use in vehicles, the fuel cell may preferably include proton exchange membrane fuel cells, also known as polymer electrolyte membrane fuel cells (PEMFC).

It goes without saying that the fuel cell unit is couplable with an electric network on board the vehicle, wherein a power electronics device, preferably an electric inverter, is arranged between the fuel cell unit and the electric network for converting the voltage delivered by the fuel cell unit to a desired level, depending on the respective demand.

For providing an air cooling function, the air cooled fuel cell unit may comprise means for transferring thermal energy from inside the at least one fuel cell to a surrounding airflow. This may be accomplished through heat transfer fins, through-flow openings, conduits or an open cathode fuel cell design.

The at least one catalytic converter is adapted for providing water in gaseous or liquid form and oxygen depleted air. The converter comprises a catalyst, i.e. a chemical substance that increases the rate of the intended chemical reaction without being consumed. In particular, the catalyst of the catalytic converter allows to lower the process temperature, thereby reducing the demand for cooling power. For example, the catalyst may be realized as a platinum powder coating inside a converter housing.

The at least one catalytic converter may be divided into several sub-components or several independent smaller catalytic converters, which may be distributed inside the air channel in different positions. This means that a smaller catalytic converter may even be located upstream of the fuel cell unit, while a larger catalytic converter may be positioned downstream of the fuel cell unit.

Preferably, the at least one catalytic converter is designed to be reliably air cooled. This may include a heat dissipation surface adapted for being passed by air flowing through the air channel, such as with a certain housing, cooling fins, cooling conduits and any other conceivable means for supporting a heat transfer from inside the catalytic converter to the air passing the converter.

An aspect of the invention includes the drastic compaction of a supply system for providing at least oxygen depleted air and water in a vehicle in a space-efficient and weight-efficient manner, while the weight of the system is clearly decreased through the serial arrangement of components and the lack of additional, separate ducts for leading air. This allows to provide a fire knock-down, fire suppression and tank inerting in a very reliable and efficient manner. Still further, due to the setup of the supply system according to the invention both the at least one catalytic converter and the fuel cell unit may be operated independent from each other. Still further, a large advantage of the supply system according to the invention is the ability to be air cooled.

In an advantageous embodiment the air cooled fuel cell unit comprises at least one open cathode fuel cell. An open cathode fuel cell may comprise a plurality of air flow conduits at a cathode side, through which air from a cathode inlet may flow. Besides providing the oxygen for the fuel cell process, the airflow also provides a cooling function to maintain a certain fuel cell temperature, as it supports a heat transfer over a large surface area. Preferably, the fuel cell unit is an open cathode PEM fuel cell stack.

Advantageously, the fuel cell unit is designed in a way that it is capable to provide power to the vehicle, e.g. the aircraft, in case of a loss of main electric power source. Hence, the fuel cell unit may be considered an emergency power supply unit to be operated only in emergency cases.

However, the fuel cell unit may also be a permanent source of electrical power, water and thermal energy. The catalytic converter thereby provides a water production unit which is segregated from a power provision unit.

The fuel cell unit may provide electrical energy to an electric heater, wherein the at least one hydrogen supply means is a tank for liquid hydrogen and wherein the electric heater is arranged in the tank. Hence, a boil off of hydrogen may be forced.

Still further, the at least one catalytic converter may be supplied with hydrogen boiling off inside the at least one hydrogen supply means, such that the catalytic converted faces provide a forced conversion of hydrogen and air into water and oxygen depleted air without any active control elements.

In a preferred embodiment, air supplied to the at least one catalytic converter exits the fuel cell unit. Using the air exiting the fuel cell unit does not alter the function of the catalytic converter at all, especially with a rather large air mass flow that does not face a clear oxygen depletion. It is beneficial that no further air conduits are necessary for enabling the function of the catalytic converter.

The air channel may be realized as a ram air channel adapted for receiving ram air induced through the motion of the vehicle. A ram air channel has a ram air inlet, which may be arranged in an outer skin of the vehicle facing into the main motion direction. This enables the ram air channel to receive ram air that impinges onto the ram air inlet, wherein the pressure and mass flow rate depends on the velocity of the vehicle. Depending on the required air mass flow at a certain mean velocity, the ram air inlet may comprise a minimum dimension, but does not necessarily comprise a circular shape. However, in an interior space the cross-sectional surface may also slightly decrease or increase from the inlet towards the outlet. The stream of oxygen depleted air is thereby provided by ram air if the vehicle, e.g. the aircraft, is moving. Also, the components inside the air channel are air cooled by means of the ram air flowing through.

Still further, the supply system may comprise a fan inside the air channel for conveying air through the air channel. The fan may be rotated by means of a motor, e.g. an electric motor. The power required for rotating the motor may be delivered by the fuel cell unit, which may be designed to provide more power than required for operating the fan or other components of the supply system. The integration of a fan allows to introduce air into the air channel in cases when the air channel is not realized as a ram air channel and in case the vehicle conducts a motion with a velocity that is insufficient for inducing a sufficient airflow in the air channel when it is realized as a ram air channel. Besides providing air for conducting the fuel cell process and the catalytic conversion, the fan also supports the cooling of the components of the supply system.

In a preferred embodiment, at least one of the at least one catalytic converter further comprises a compressor upstream of a catalytic conversion unit. Using a compressor upstream of the catalytic converter allows to increase the mass flow of oxygen depleted air in the catalytic converter and contributes to the compact design of the air channel and, consequently, of the whole supply system. In particular this may be useful on ground. Again, the compressor may be rotated by means of a motor, such as an electric motor, which may be provided with electric power by means of the fuel cell unit.

Additionally, the catalytic converter may comprise a turbine downstream of the catalytic conversion unit. The catalytic converter may then be adapted for providing the catalytic conversion in a position between the compressor and the turbine, such that compressed air is fed into the catalytic converter, after which the products generated in the catalytic converter flow through the turbine. By this measure, a large mass flow of oxygen depleted air is generatable, while through the expansion in the turbine a pre-cooling of the oxygen depleted air is accomplished. Further, the required mechanical power of the compressor due to the mechanical power created by the turbine is decreased.

In a still further advantageous embodiment, at least one of the at least one catalytic converter is arranged inside the air channel upstream of the fuel cell unit. A catalytic converter at this position may preferably comprise a lower power design compared to a catalytic converter downstream of the fuel cell unit, such that it is preferably used for increasing the humidity of the air flowing to the fuel cell unit in order to improve its function, but does not substantially raise the temperature of the air flowing into the fuel cell unit. At this position, said catalytic converter upstream of the fuel cell unit may also be considered a catalytic humidifier. The operation of this catalytic humidifier is preferably controlled depending the humidity and temperature of the air entering the fuel cell unit especially on high altitude.

At this point it is indicated that it may be preferred to use a polymer electrolyte membrane fuel cell (PEMFC) operating at low or medium temperatures, and comprising a membrane that requires a certain humidity level.

For using the supply system only temporary, the air channel may further comprise a flap adapted for opening and closing the air channel. For example, the flap may comprise a shape adapted to the cross-sectional surface of the air channel, thereby allowing to completely shut the air channel. The flap may be motorized or actuated, such that it may automatically open when the supply system is set into operation. In this regard, a drive unit for actuating said flap may be coupled with the fuel cell unit, such that it receives electrical power once the fuel cell unit is set into operation automatically.

In an advantageous embodiment, the flap may be actuated by a pneumatic actuator, which is coupled with a hydrogen supply line coupled with the fuel cell unit and/or the catalytic converter. Hence, once a hydrogen pressure is available, the flap may be opened automatically through the pneumatic actuator. Preferably, the pneumatic actuator comprises a return spring, which is adapted for returning the flap into a neutral position once the hydrogen pressure is disappeared.

The supply system may comprise an outlet for oxygen depleted air, which outlet is coupled with at least one of the air channel, the air cooled fuel cell unit and the at least one catalytic converter. Particularly, the supply system may comprise an outlet for oxygen depleted air, which outlet is coupled with the air channel in a position between the catalytic converter and the outlet of the air channel. The catalytic converter delivers oxygen depleted air into the air channel at a downstream end, which may simply be delivered to the ambient in case the air channel is a ram air channel. However, the airflow through the air channel must not be completely hindered, such that it is considered advantageous to couple an outlet for oxygen depleted air with the air channel in a certain position downstream the catalytic converter. Exemplarily, an outlet of the catalytic converter may be coupled with an outlet for oxygen depleted air, while an annular cooling air flow may be disposed of the vehicle through the air channel.

Finally, the system according to the invention may further comprise at least one of a water separator and a condenser. A condenser may be required when water occurs in gaseous form, for example downstream the catalytic converter, depending on its operating temperature, or downstream the fuel cell unit operating at elevated temperatures. The condenser may also be part of the catalytic converter design in a way that only external water separators are required. Hence, the at least one catalytic converter provides water to the vehicle, e.g. the aircraft, by condensing the water off the stream of oxygen depleted air.

The invention further relates to an aircraft having such a supply system. Preferably, the aircraft further comprises at least one cargo compartment, which is couplable with an outlet for oxygen depleted air in order to provide a fire knockdown and fire suppression function. Still further, the aircraft may comprise at least one fuel tank, which is also couplable with an outlet for oxygen depleted air, such that an inerting function may be provided.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
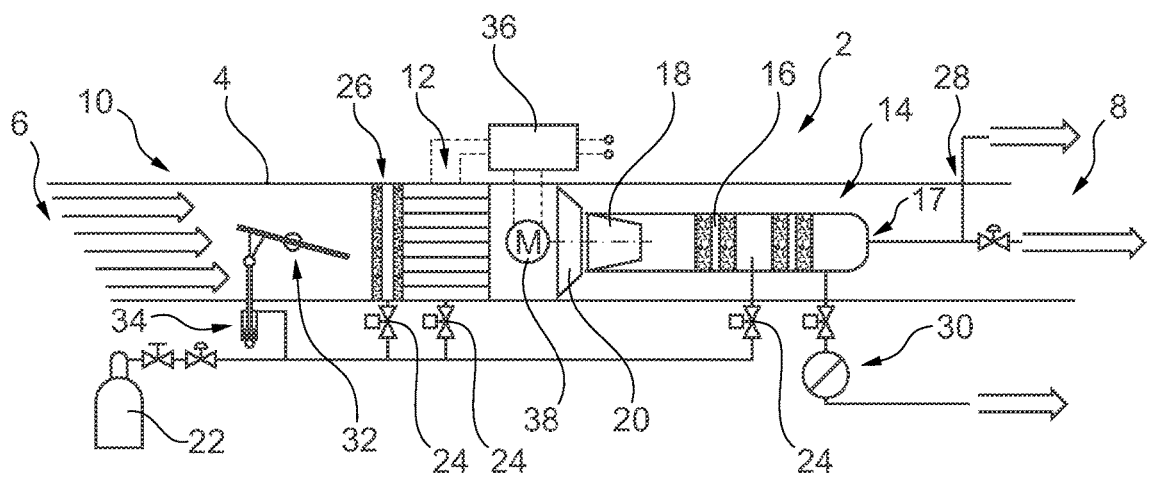
FIG. 1 shows a first exemplary embodiment of a supply system in a schematic view.

In FIG. 1, a supply system 2 is shown, which comprises an air channel 4 having an inlet 6 and an outlet 8. As FIG. 1 is only a schematic drawing, the air channel 4 is shown as a longitudinal air channel having an exemplarily constant cross-sectional surface area. However, depending on the available installation space inside the vehicle, into which the supply system 2 is to be installed, and/or depending on other demands, the extension of the air channel 4 and the course of the cross-sectional surface may be completely different.

In an interior space of the air channel 4, i.e. surrounded by walls 10, an air cooled fuel cell unit 12 is positioned, which exemplarily extends over the whole cross-sectional surface area at this position. The air cooled fuel cell unit 12 may be realized as an open cathode fuel cell stack, preferably as a PEM fuel cell. The fuel cell unit 12 may comprise a cathode having air conduits or any other open surface sections, through which air from the inlet 6 may flow, wherein the oxygen content will be depleted upon operation of the fuel cell unit 12. During the flow-through, heat arising in the fuel cell unit 12 is transferred to the air. Consequently, the fuel cell unit 12 is cooled.

Further downstream, a first catalytic converter 14 is present, which is adapted for a catalytic conversion of hydrogen and oxygen to water through a catalytic conversion unit 16. The catalytic converter 14 receives air that exits the fuel cell unit 12, which may be further compressed by a compressor 18 and/or conveyed by means of a fan 20. As the catalytic converter 14 is supplied with air, the oxygen content of the air is further reduced, such that oxygen depleted air exits the outlet 8 of the air channel 4.

It goes without saying that the fuel cell unit 12 and the catalytic converter 14 are both couplable with a hydrogen supply means 22 in the form of a hydrogen storage unit. For controlling the hydrogen mass flow, dedicated valves 24 are present.

Still further, a second catalytic converter 26 may be positioned upstream of the fuel cell unit 12, which second catalytic converter 26 is also coupled to the hydrogen supply means 22 and is primarily used for generating water for humidity and temperature control of the air cooled fuel cell unit 12. A controller may be present, which controls the operation of the second catalytic converter, depending on the actual humidity level of the fuel cell unit 12.

By means of an oxygen depleted air outlet 28, which is coupled with the outlet 8 of the air channel 4 and/or an outlet 17 of the first catalytic converter 14, oxygen depleted air may be supplied to different entities or devices, in particular for fire knockdown, fire suppression or inerting a space. For example, a fuel tank or a cargo compartment (both not illustrated) of an aircraft may be supplied with oxygen depleted air.

Still further, due to the generation of water in the first catalytic converter 14, a drain valve 30 may be present for disposal of water for example into a water storage unit of a water system. In the depicted example, a condenser or water separator is not explicitly shown. However, depending on the temperature levels in the first catalytic converter 14 and/or the fuel cell unit 12, a condenser and/or a water separator may be necessary or advantageous. It goes without saying, that a condenser or a water separator may be an external component.

As the supply system 2 according to FIG. 1 is dedicated for temporary use, a flap 32 is located upstream of the second catalytic converter 26, is coupled with a drive unit 34 and adapted for selectively opening and closing the cross-sectional surface of the air channel 4. Hereby, the air channel 4 may be completely closed for improving the aerodynamic properties of the vehicle. In the exemplary example, the drive unit 34 is coupled with the hydrogen supply means 22. Hence, only when hydrogen is supplied to any of the components inside the air channel 4, the drive unit 34 opens the flap 32. An automatic closure may be conducted through a pre-tensioned element inside the drive unit 34, such as a spring, which returns the flap 32 into a closed position.

The fuel cell unit 12 provides electrical power, which may be transformed to a desired voltage level by means of a power electronics 36 for supplying it into an electrical power network of the vehicle and for providing it to an electric motor 38 for selectively operating the fan 20 and/or the compressor 18.

Due to the arrangement of all components in the interior space of the air channel 4, it is possible to provide a sufficient cooling of the components if the air mass flow is high enough. Especially the first catalytic converter 14 does not completely fill the cross-sectional surface of the air channel and leaves an annular space, through which air exiting the air cooled fuel cell 12 unit may flow. Consequently, also the first catalytic converter 14 is cooled through transferring thermal energy to the airflow. However, if the air flow through the air channel 4 is not sufficient, it may be supported by means of the fan 20, in particular when the vehicle is not moving.

Figure 2:
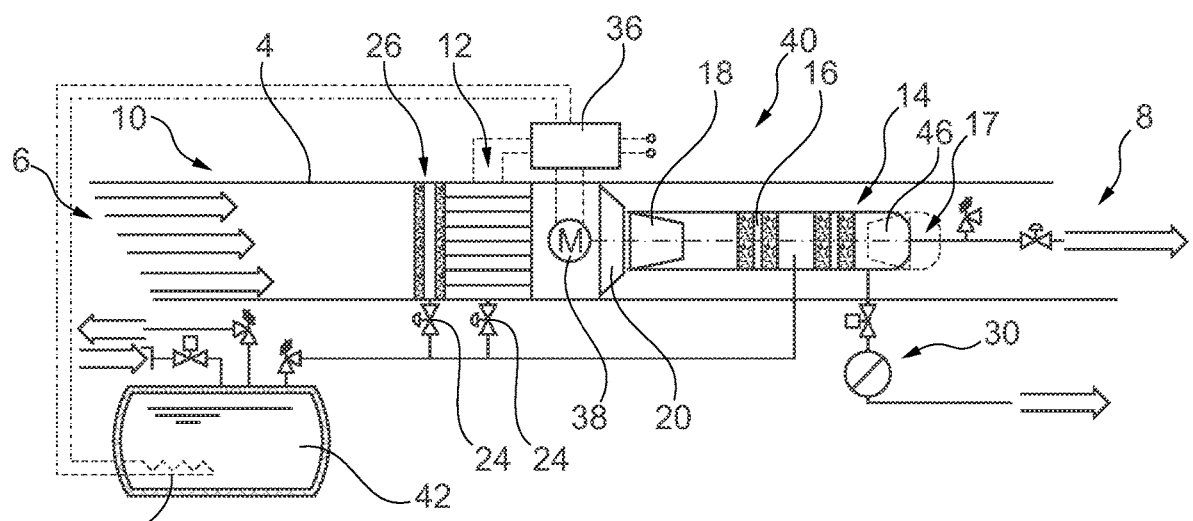
FIG. 2 shows a further exemplary embodiment of the supply system according to the invention.

FIG. 2 shows another exemplary supply system 40, which is dedicated for a more permanent, constant operation. Basically, the design of the supply system 40 is similar to the supply system 2 shown in FIG. 1. However, the flap 32 as well as the drive unit 34 are eliminated, as the operation is meant to be permanent.

As a hydrogen supply means a storage tank 42 is used, which is a low insulation storage tank for storing liquid hydrogen. Besides a temperature difference induced tendency to boil off hydrogen, an additional electrical heater 44 is present, which is electrically coupled with the fuel cell unit 12. For a protection of hydrogen pipes between the storage tank 42 and the hydrogen consumers, a plurality of pressure relief valves 48 is provided, which dispose of hydrogen in case of an excess pressure in the respective pipe section.

Through actively boiling off hydrogen, the first catalytic converter 14 may be forced to deliver water and oxygen depleted air in an amount depending on the hydrogen mass flow. The compressor 18 is capable of providing a sufficient air pressure in the first catalytic converter 12 for handling the hydrogen mass flow. This may be of particular use for fire knock down, as a rather high mass flow of oxygen depleted air may be realized.

In FIG. 2 an optional turbine 46 in the catalytic converter 14 is indicated by means of dashed lines. The integration of such a turbine 46 supports the drive of the compressor 18 and allows to reduce the required electrical power delivered by the fuel cell unit 12.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A supply system for providing at least oxygen depleted air and water in a vehicle, the system comprising:
   at least one hydrogen supply means;
   an air channel defined by a wall and having an inlet and an outlet;
   an air cooled fuel cell unit; and
   at least one catalytic converter;
   wherein the air channel is adapted for leading air from the inlet to the outlet,
   wherein the air cooled fuel cell unit is couplable with the at least one hydrogen supply means and is arranged inside the air channel and surrounded by the wall,
   wherein at least one of the at least one catalytic converter is couplable with the at least one hydrogen supply means and is arranged between the fuel cell unit and the outlet of the air channel inside the air channel and is surrounded by the wall,
   wherein the air cooled fuel cell unit is adapted for conducting a fuel cell process under consumption of air flowing from the inlet of the air channel through the air cooled fuel cell unit and hydrogen from the at least one hydrogen supply means, and
   wherein at least one of the at least one catalytic converter is adapted for producing water and oxygen depleted air under consumption of hydrogen from the at least one hydrogen supply means and air.

2. The supply system of claim 1, wherein the air cooled fuel cell unit comprises at least one open cathode fuel cell.

3. The supply system of claim 2, wherein the air supplied to the at least one catalytic converter exits the air cooled fuel cell unit.

4. The supply system of claim 1, wherein the air channel is a ram air channel adapted for receiving ram air induced through the motion of the vehicle.

5. The supply system of claim 1, further comprising a fan inside the air channel for moving air through the air channel.

6. The supply system of claim 1, wherein the at least one catalytic converter further comprises a compressor upstream of a catalytic conversion unit.

7. The supply system of claim 6, wherein the at least one catalytic converter comprises a turbine downstream of the catalytic conversion unit coupled with the compressor.

8. The supply system of claim 1, further comprising an outlet for oxygen depleted air, the outlet being coupled with at least one of the air channel, the air cooled fuel cell unit and the at least one catalytic converter.

9. The supply system of claim 8, wherein the outlet for oxygen depleted air is coupled with the air channel in a position between the at least one catalytic converter and the outlet of the air channel.

10. The supply system of claim 1, wherein at least one of the at least one catalytic converter is arranged inside the air channel upstream of the air cooled fuel cell unit for at least one of humidification and temperature control of air flowing to the air cooled fuel cell unit.

11. The supply system of claim 1, further comprising a flap or a valve adapted for selectively opening and closing the air channel.

12. The supply system of claim 1, further comprising at least one of a water separator and a condenser.

13. An aircraft having a supply system of claim 1.

14. The aircraft of claim 13, further comprising at least one cargo compartment couplable with an outlet for oxygen depleted air to provide a fire knockdown and fire suppression function.

15. The aircraft of claim 13, further comprising at least one fuel tank couplable with an outlet for oxygen depleted air to provide an inerting function.

16. The supply system of claim 1, wherein the at least one catalytic converter is directly coupled with the at least one hydrogen supply means, and wherein the air cooled fuel cell unit and the at least one catalytic converter are operable independent from each other under consumption of the air flowing through the air channel and the hydrogen.

* * * * *